(12) United States Patent
Kramer

(10) Patent No.: US 7,000,480 B2
(45) Date of Patent: Feb. 21, 2006

(54) AIR FLOW CONTROL DEVICE WITH DIFFERENTIAL PRESSURE SENSING ASSEMBLY AND METHOD

(76) Inventor: Robert E. Kramer, 505-8th Ave., 25th Floor, New York, NY (US) 10018

( * ) Notice: Subject to any disclaimer, the term of this patent is extended or adjusted under 35 U.S.C. 154(b) by 169 days.

(21) Appl. No.: 10/762,701

(22) Filed: Jan. 23, 2004

(65) Prior Publication Data

US 2005/0173548 A1   Aug. 11, 2005

(51) Int. Cl.
*G01L 7/00* (2006.01)
(52) U.S. Cl. ...................................................... 73/714
(58) Field of Classification Search .. 73/170.1–170.15, 73/700–756, 861.42–861.69; 137/501, 503, 137/505.13, 508, 505.25
See application file for complete search history.

(56) References Cited

U.S. PATENT DOCUMENTS

| | | |
|---|---|---|
| 2,838,932 A | 6/1958 | Dwyer |
| 4,133,213 A | 1/1979 | Brandt, Jr. |
| RE30,953 E | 6/1982 | Vance et al. |
| 4,491,270 A | 1/1985 | Brand |
| 4,509,678 A | 4/1985 | Noll |
| 4,515,069 A | 5/1985 | Kline et al. |
| 4,523,713 A | 6/1985 | Kline et al. |
| 4,537,347 A | 8/1985 | Noll et al. |
| 4,591,093 A | 5/1986 | Elliott, Jr. |
| 4,821,955 A | 4/1989 | Kline et al. |
| 5,255,709 A * | 10/1993 | Palmer .......................... 137/501 |
| 5,271,558 A | 12/1993 | Hampton |
| 5,364,304 A | 11/1994 | Hampton |
| 5,634,490 A * | 6/1997 | Palmer .......................... 137/501 |
| 5,705,734 A | 1/1998 | Ahmed |

* cited by examiner

*Primary Examiner*—William Oen
(74) *Attorney, Agent, or Firm*—Dorsey & Whitney LLP

(57) ABSTRACT

An air flow control device, such as an air diffuser (21) with a differential pressure sensing assembly. The diffuser (21) has a housing (29) formed for mounting to a supply air conduit (22) for discharge of supply air (54) into a room (56). The differential pressure sensing assembly includes a diffuser-mounted portion (41) and a detachable sensor portion (40). The diffuser mounted portion (41) is provided by a pressure tube (42) having at least one opening (43) therein mounted to the housing (29) with the opening (43) positioned proximate an area of known cross section to communicate pressure at the opening (43) to an open distal end (46) of the tube (42). The distal end (46) is secured in a position accessible from a room side (51) of the housing (29). The distal end (46) of the tube (42) is formed for releasable coupling of the detachable sensor portion (40) of the differential pressure sensing assembly thereto, and the sensor portion includes a differential pressure measurement device (61) for measurement of the difference between the supply air pressure in the diffuser (21) at the known area and the ambient room air pressure. This measurement is made from a room side (51) of the housing (29) and allows a determination of the supply air flow rate through the diffuser to be made. A method of measuring air flow rate in an air flow control device (21) is also disclosed.

28 Claims, 3 Drawing Sheets

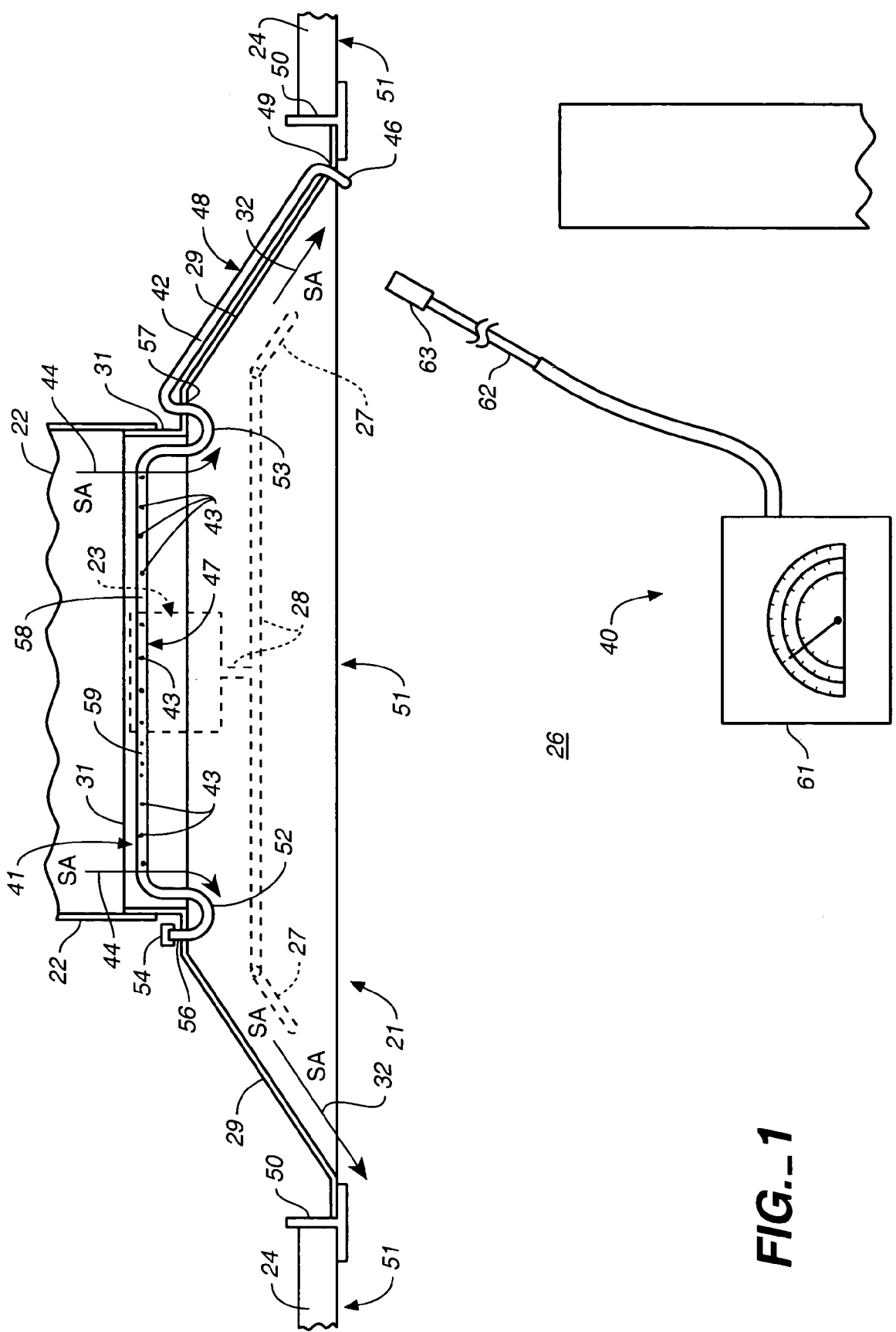
FIG._1

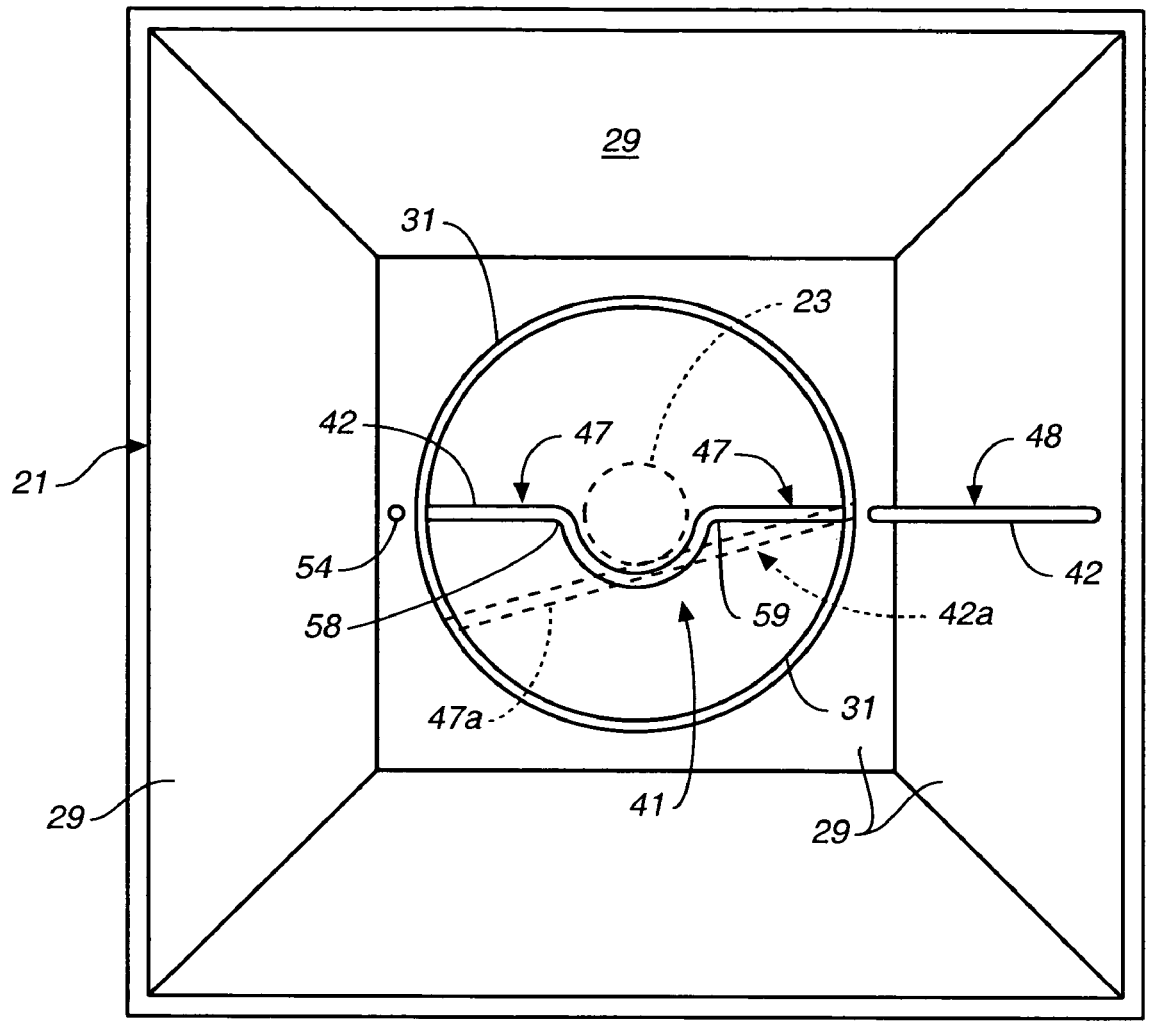
FIG._2

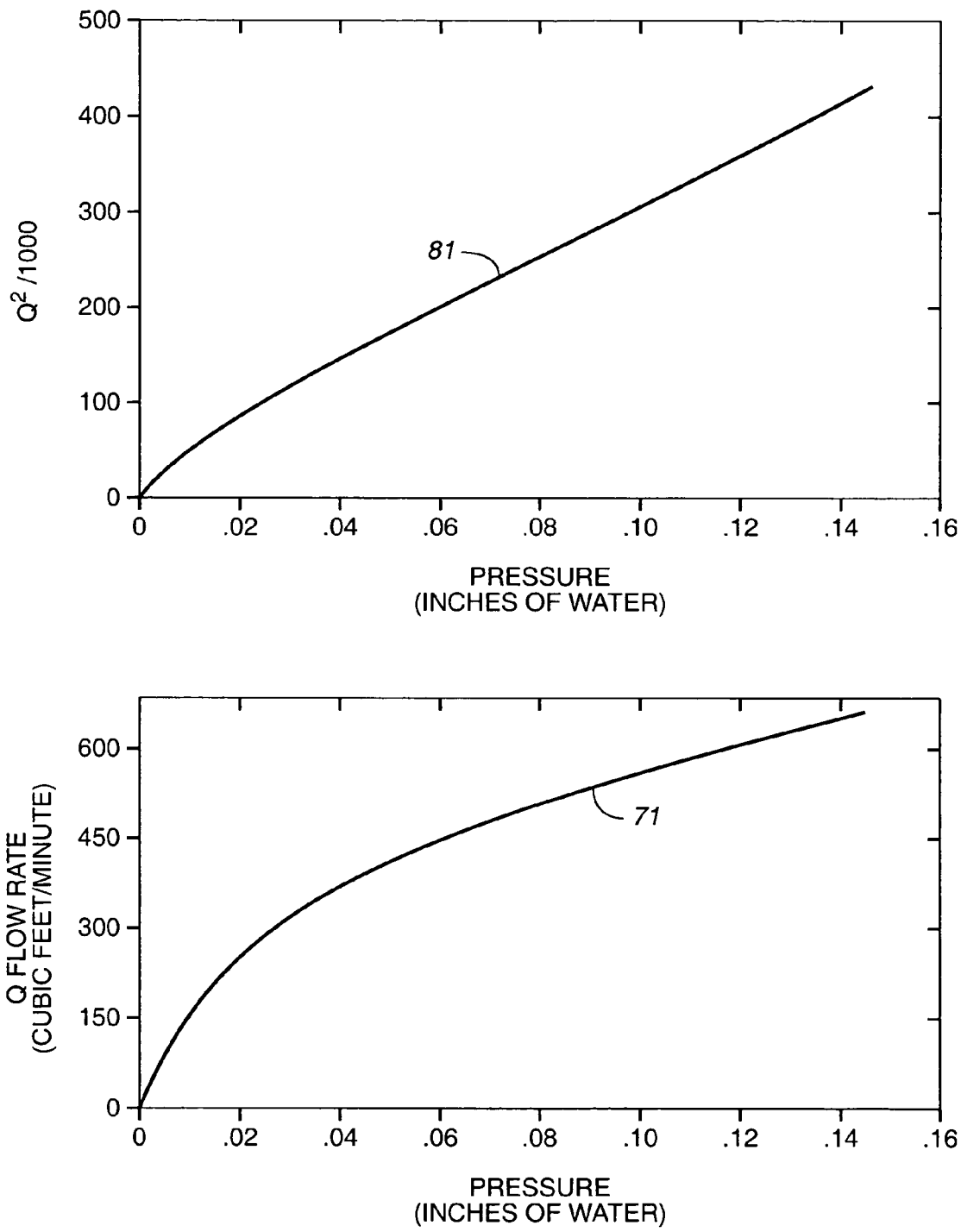
FIG._3

100
AIR FLOW CONTROL DEVICE WITH DIFFERENTIAL PRESSURE SENSING ASSEMBLY AND METHOD

TECHNICAL FIELD

The present invention relates, in general, to HVAC systems having an air flow control device, such as air diffusers, VAV boxes or return air control devices for control of the volume of air discharged into, or exhausted from, a room or space, and more particularly, relates to apparatus and methods for balancing the rate of air flow within an HVAC system.

BACKGROUND ART

Heating, ventilating and air conditioning systems (HVAC systems) make extensive use of air flow control devices, such as fixed and variable air volume (VAV) air diffusers, VAV boxes and return air flow control devices. HVAC systems typically include a network of ducts that extend from a central air supply or air source. These ducts extend to a plurality of rooms or spaces into which the supply air is to be discharged and typically at least one return air duct extends back from one of the spaces to the air supply source. Mounted on the various branches of the HVAC supply air duct network will be air diffusers which discharge the supply air into the room and which are used to control, actively or passively, the amount of air discharged. In a VAV diffuser there is a movable damper assembly which modulates the flow rate of air in order to control temperature or ventilation in the room. In a fixed air diffuser, there also will be a damper assembly that can be adjusted manually, but once adjusted, does not modulate or vary the air volume being discharged. In a fixed volume diffuser systems the air temperature usually is modulated at the source of the supply air to control room air temperature, or an "on" and "off" thermostatic control of air volume is used. Return air ducts also can be provided with adjustable damper assemblies to control the flow rate of air returned to the source.

When designing an air conditioning system using cooled air, the peak cooling load for each space is determined and from that load, the design air volume to be discharged into the space is calculated. Design air volume may vary between spaces as each space may have a different peak cooling load. For example, corner rooms. Both usually have a higher cooling load than interior spaces. The cooling load for each space may also include office equipment with large cooling requirements, such as a copy machine, if it is known where they will be located. The sum of various peak loads for a space determines the design air volume or flow for that space.

The purpose of air balancing an HVAC system is to achieve design air flow into each space at peak or design system air flow. Less than design air flow into a given space usually results in insufficient cooling, and more than design air flow results in overcooling. Air balancing insures that the air flow will be correct at peak or design cooling load conditions.

At times other than peak loading, cooling must be reduced. Cooling reduction for constant volume systems is accomplished by raising the supply air temperature and for variable air volume (VAV) systems by reducing the supply air volume.

When cooling is reduced, the system usually becomes unbalanced primarily because the cooling loads for each space do not reduce exactly in proportion to the design loads for each space, but instead, reduce in a random fashion. The remedy for this is to provide some form of control for each space. Constant volume systems may have a heating coil to raise the supply air temperature for that space (constant volume reheat). VAV systems may separately vary the air volume to each space, and the VAV diffuser is one method of varying the air volume to each space. Another more expensive approach to varying the air volume to each space is to provide a VAV box in the supply air duct for each space.

Method of HVAC System Air Balancing

Constant volume air systems, as a minimum, are comprised of an air handling unit which contains the fan, duct work to channel the air, and finally fixed constant volume diffusers to diffuse the air into the space. A balancing damper is located in each duct supplying each diffuser. The function of the balancing damper is to add pressure drop, both to compensate for the varying duct lengths to each diffuser and to obtain the correct static pressure at each diffuser for the specific design air volume of that diffuser. Also necessary is a channel or duct to return air from the space to the fan. Other devices may be included, such as reheat coils, and a method of introducing outside air into the supply air to meet ventilation requirements.

Balancing a constant volume system is accomplished by measuring the total air flow at the fan and the air flows through each diffuser and then adjusting and readjusting the fan speed and the balancing dampers for each diffuser until the air flows, both at the fan and through each diffuser, are all at design.

VAV box systems differ from constant volume in that VAV boxes are located between the fan and the fixed diffusers. When balancing, the boxes must be temporarily fixed wide open. Balancing is then done exactly the same as for a constant volume system, with duct-mounted balancing dampers, to achieve design air flow at both the fan and through each diffuser.

VAV diffuser systems differ from a constant volume system in that a VAV diffuser is used to control the supply air volume discharged instead of controlling the supply air temperature discharged from a fixed diffuser. These systems also may have static pressure controls such as zone dampers in the cutwork. When balancing a VAV-based system, both the VAV diffusers and the static pressure controls must be temporarily fixed open. Then, like VAV boxes, balancing is done using balancing dampers exactly the same as for a constant volume system to achieve design air flow at the fan and through each diffuser.

Part of the balancing process, whether the system is constant volume, VAV box or VAV diffuser, is to measure the air flow through each diffuser. Present methods for doing this are: 1) to use a "flow hood" to directly measure the flow through the diffuser, or 2) to measure the air velocity at the diffuser outlet and then use a factor (Ak) provided by the manufacturer to convert the velocity to air flow.

The present invention measures the pressure differential or drop over the diffuser by measuring the pressure in a known cross sectional area of the diffuser, such as the inlet of the diffuser, as compared to the space or room pressure. Pressure drop over a known area directly corresponds to flow through it. Therefore. a table can be provided to convert the pressure drop over the diffuser into an air flow rate.

Prior art "flow hoods" used to directly measure air flow through an air diffuser will typically include a hood portion which can be positioned over the outside of the diffuser so as to catch the air discharged from the diffuser. The hood is formed as a funnel which directs the discharged air down to a flow meter, such as an analog, dial-type, pressure differential measuring device, which is capable of measuring the discharge air flow rate.

Typical of prior art electronic flow hoods are the flow hoods manufactured by Dwyer Instruments, Inc. of Michigan City, Ind. and Short Ridge Instruments, Inc. of Scottsdale, Ariz.

The use of electronic flow hoods to balance HVAC systems is effective, but it also has been accompanied by numerous problems. Flow hoods are very bulky since they must extend around the diffuser discharge opening in order to capture substantially all of the air discharged from the diffuser. Flow hoods also have substantial height dimensions in order to funnel the air down to the meter. Thus, the balancing process is quite awkward and tedious. Still further, balancing some diffusers using a flow hood can essentially be impossible because of structures in the room or the configuration of the room itself. Thus, rooms with room-dividing partitions often interfere with placement of a flow hood around the diffuser. Similarly, alcoves, bookcases, furniture and the like make periodic checking of the diffuser balance extremely difficult or impossible. As a practical matter, HVAC systems often have diffusers which are only approximately balanced by air conditioning technicians, usually by working off of actual measurements of nearby diffusers.

Additionally, HVAC diffusers often have discharge openings which require custom flow hoods to catch the discharged air. While such custom hoods are available, they require the testing company to maintain an inventory of hoods so that they can do balancing on a variety of diffuser systems.

HVAC diffuser systems have previously included pressure sensing devices which are incorporated into the automatic controls regulating the volume of air discharged from the diffuser. Most of these systems include a pressure sensor that senses static pressure, or velocity pressure, or differential pressure, or various combinations thereof. In such systems the transducer is built into the HVAC system and a meter is provided at the pressure transducer assembly or at the control box for the overall system. Again, such built-in pressure sensing assemblies are effective and can be used to control the volume of discharge by calibrating the sensed pressure to the volume of flow discharged through the diffuser. This approach, however, requires that a dedicated flow meter be built into, or coupled to, each diffuser, and it accordingly increases the overall system cost substantially. Such a dedicated metering system clearly is not cost effective for, for example, relatively low-cost fixed-volume diffuser systems. Building in pressure meters for each diffuser in an HVAC system, therefore, provides more capability than necessary, particularly when considering the fact that balancing of such systems is only required at installation and only periodically thereafter.

U.S. Pat. Nos. 5,705,743; 5,364,304; 5,271,558; 4,591,093; 4,133,212 and 2,838,932 are typical of built-in pressure measuring systems and of anemometers that can be adapted for use in such systems.

DISCLOSURE OF INVENTION

An air flow control device, such as a VAV or fixed diffuser, VAV box or return air damper assembly with a differential pressure sensing assembly is provided. The air flow control device has a housing formed for mounting to an air conduit of an HVAC system, and the housing is formed for one of the discharge of supply air into a room or the return of air from the room. A portion of the differential pressure sensing assembly is mounted to the housing of the air flow control device and that portion includes a pressure tube having at least one opening therein. The tube is mounted to the housing with the opening positioned proximate a known cross sectional area of the housing to communicate pressure at the opening into the tube to enable sensing of the air pressure in the housing. The tube extends, and is adapted to communicate pressure from the opening to a distal end of the tube, with the distal end of the tube being secured in a position accessible from a room side of the housing. The distal end of the pressure tube is formed for releasable coupling of a differential pressure measurement device thereto for measurement of the pressure drop between the air pressure in the housing and the room air pressure, with the measurement taking place from the room side of the housing.

The pressure sensing tube preferably takes the form of an elongated tube that extends transversely substantially across a neck portion of the housing, and the tube preferably includes a plurality of openings oriented approximately perpendicular to the flow of air in the neck of the housing. The pressure tube portion of the pressure drop sensing assembly remains in the housing and is not permanently connected to the differential pressure sensing meter. Instead, an air pressure drop measurement device, including a transducer formed to measure pressure drop, is releasably coupled to the tube distal end solely for the purpose of making a pressure drop measurement that can be used, for example, to determine the air flow rate in the housing for balancing of the air flow rates from a plurality of diffusers in an HVAC system.

In other aspect, a pressure tube is provided which can be retrofit into an existing diffuser so as to provide a pressure tube distal end accessible on a room side of the diffuser to which a differential pressure measuring meter can be easily and releasably coupled for HVAC system balancing.

The method of measuring the air pressure drop in an air flow control device or diffuser housing of the present invention is comprised, briefly, of the steps: of mounting an air pressure communicating tube having at least one opening therein to a housing of the air flow control device in a position to sense air pressure proximate a known cross sectional area of the housing; from a room side of the air flow control device or diffuser, releasably coupling a differential air pressure measurement device to the distal end of the pressure tube; and measuring the air pressure drop between the supply air pressure at air flow control device communicated to the distal end of the pressure tube and the ambient pressure in the room using the differential pressure measurement device. Thereafter, removing the differential pressure measurement device from the distal end, leaving the pressure tube mounted in the air flow control device for subsequent measurements, as required.

BRIEF DESCRIPTION OF THE DRAWINGS

FIG. 1 is a side elevation view, in cross section, of a VAV diffuser with a differential pressure sensing assembly constructed in accordance with the present invention.

FIG. 2 is a top plan view of the diffuser of FIG. 1.

FIG. 3 are calibration curves for one embodiment of the diffuser and differential pressure sensing assembly of FIG. 1.

BEST MODE OF CARRYING OUT THE INVENTION

Reference will now be made in detail to a preferred embodiment of the invention, an example of which is illustrated in the accompany drawing. While the invention will describe in conjunction with a preferred embodiment, it will be understood that it is not intended to limit the invention to such embodiment. On the contrary, the invention is intended to cover alternatives, modifications and equivalents, which may be included within the spirit and scope of the invention, as defined by the appended claims.

Referring now to FIGS. 1 and 2, a VAV diffuser, generally designated 21, is shown mounted to a supply air duct 22 of an HVAC system. Diffuser 21 will typically be mounted in the ceiling of a room or space to be air conditioned and/or ventilated, for example, in a drop down ceiling having ceiling panels 24. Supply air, SA, will be communicated down duct 22 from a supply air source, not shown, and will pass through diffuser 21 into space or room 26. Since the diffuser illustrated is a VAV diffuser, a damper control assembly 23 (shown in broken lines) can be provided which is coupled to control movement of dampers blades 27 through a linkage assembly 28.

The novelty of the present invention does not reside in the control assembly 23, nor in the particular damper 27 or linkage 28 used to control the flow of supply air from diffuser 21. Typical of thermally-actuated VAV diffusers are those described in U.S. Pat. Nos. 4,491,270; 4,509,678; 4,515,069; 4,523,713; 4,537,347; 4,821,955 and Re 30,953. It will be understood that the present invention can also be used with VAV diffusers that are controlled by electric motors, pneumatic actuator systems and other techniques employed for powering VAV diffusers.

FIGS. 1 and 2 illustrate an air diffuser, but the present invention, in its broadest aspect, is also adaptable for use in other types of air flow control devices in HVAC systems. Thus "air flow control device," as used herein, shall include VAV boxes mounted upstream of diffusers in the duct work to which diffusers are mounted, and shall include the fixed volume diffusers, as well as variable volume diffusers, and return air adjustable damper assemblies.

Returning now to FIGS. 1 and 2, diffuser 21 will be seen to include a housing 29 having a neck portion 31 that is coupled to conduit 22, for example, by fasteners, adhesives, or the like, in a manner well known in the industry. Housing 29 also is formed for discharge of supply air, SA, from the diffuser, as indicated by arrows 32. In the preferred form, supply air SA will be discharged close enough to ceiling panels 24 and at an angle which will achieve the Coanda effect, namely, hugging of the discharged supply air to the ceiling as it moves laterally away from the diffuser before the discharged air descends into the room. Use of the Coanda effect avoids air dumping in the room. Again, however, the particular manner in which air is discharged from diffuser 21 is not regarded as a novel portion of the present invention and the Coanda effect is well known.

In order to facilitate HVAC system balancing, diffuser 21 further is provided with a differential pressure sensing assembly having air flow control device mounted portion, generally designated 41, and a detachable sensor portion, generally designated 40. Assembly portion 41 most preferably takes the form of a pressure tube 42 having at least one opening, and preferably a plurality of openings, 43 therein. Tube 42 is mounted to diffuser or air flow control device housing 29 with openings 43 positioned proximate an area in the housing, such as the neck, in which the cross sectional area in which air is flowing is known. Tube 42 communicates the supply air pressure at the location of openings 43 down the tube to a distal end 46 of the tube.

In a most preferred form, openings 43 are oriented in substantially perpendicular relation to the flow of supply air in neck 31 as supply air, SA, passes beyond the tube. Thus, openings 43 can be seen to be in a generally horizontal plane, while supply air, SA, is generally vertical, as indicated by arrow 44.

The pressure being communicated into tube 42 when openings 43 are perpendicular to the flow of air is not the velocity pressure, nor the total pressure of the supply air at the neck of the housing, but instead is the static pressure. It is possible to orient openings 43 to face incoming supply air, SA, and thereby measure the total or velocity air pressure in the housing. It would also be possible to provide a pair of tubes, with an upper tube having openings facing the incoming supply air and the lower tube having openings facing away incoming supply air so as to measure a differential air pressure in the housing at a known cross sectional area. Such a two tube differential pressure could then be sensed by a plug-in measuring device which plugs in or attaches to two tube distal ends. Thus, the differential between the two tubes would be used instead of a differential between one tube and room ambient pressure.

In the one tube embodiment shown, tube 42 continues from tube neck section 47 for the communication of air pressure from openings 43 to an open distal end 46 of the pressure tube. Thus, the pressure tube has a section 47 that extends transversely across substantially the entire neck 33 of the diffuser housing (or another known area of an air flow control device), and an extension section 48 which is coupled thereto and extends from the neck section down the housing to position distal end 46 on a room side of housing 29. Communication of the pressure at the neck or known area to a room side of the housing is most preferably accomplished by having tube 42 extend along an outside of housing 29 and down the housing to proximate the discharge opening of the diffuser. At position 49, tube extension section 48 passes through the housing wall to position distal end 46 inside the periphery of the housing for access to distal end 46 from room side 51 of the diffuser. It will be seen from FIG. 1 that by having pressure tube 42 pass back through housing 29 at a position 49, tube 42 will not interfere with mounting of the diffuser to the T-bars 50 on which ceiling panel 24 are supported.

Pressure tube 42 preferably has a relatively small diameter, which will cause it to have an insignificant affect on the flow rate of air discharged out of diffuser between housing 29 and damper blades 27. Thus, the diffuser discharge opening, between the damper and housing, can be a location at which tube 42 protrudes slightly, for example, one quarter to one half inch from the side wall of housing 29. It is only required that distal end 46 protrude by an amount which is sufficient to be visible to the technician who is doing the differential pressure measurement and further sufficient for coupling of a differential pressure sensing assembly 40 to distal end 46.

In the illustrated embodiment of pressure tube 42, the tube has a U-shaped end 52 and a second U-shaped intermediate portion 53, which will result in neck section 47 of the pressure tube being elevated upwardly into a neck of the diffuser. U-shaped section 52 has a closed end 54 which can extend through the diffuser housing at 56 so as to secure the neck section of tube 42 firmly to the housing. U-shaped section 53 extends through housing 29 at 57. As best may be seen in FIG. 2, a pair of bends 58 and 59 and intermediate arcuate tube section can be provided in neck section 47 so as to allow the tube to extend peripherally around damper control assembly 23. Alternatively, neck section 47a, as shown in broken lines in FIG. 2, can be straight and extend at an angle accommodating control assembly 23. For fixed diffusers and other air flow control devices, the portion of tube 42 having openings 43 can be readily adapted to the local housing and control assembly geometry.

As will be appreciated, pressure tube 42 can be a relatively low cost member, being comprised of a tube closed at one end, open at the other end and provided with a plurality of openings in the section having openings 43. The tube is bent to a configuration which is dependent upon the configuration of the diffuser housing and control assembly, if any, and includes a smooth distal end 46 or can also include a coupling sleeve or the like, if desired. In a most preferred form, however, distal end 46 merely is a relatively smooth end which will releasably receive a rubber coupling over the end, in a manner which will be described in more detail hereinafter.

The inherent low cost nature of tube 42, or the diffuser-mounted portion 41 of the sensor assembly, allows it to be placed in a diffuser 21 as original equipment and simply left in place at all times, without materially affecting the overall cost of the diffuser. Similarly, such a tube can also be retrofit to an existing diffuser by simply drilling openings in the housing of the diffuser and inserting pressure tube 42 into a position which will allow the measurement of pressure within a known area of the housing from a room side of the diffuser.

The pressure sensed can be compared to ambient room air pressure and the pressure drop or differential can be calibrated to give an output measurement of the flow rate of air discharged from the flow control device. It is advantageous, in terms of accuracy and ease of calibration, for tube 42 to extend substantially across the neck portion of the diffuser housing. This allows an approximate average pressure to be sensed, which will reduce inaccuracies in measurement due to the configuration of duct 22 above the diffuser and any possible preferential flow patterns downstream of the neck of the diffuser. It should be noted, however, that for system balancing it is not absolutely essential that high precision be achieved. Thus, for example, if only an approximate cross sectional area is known at which the pressure tube is positioned, that area usually will suffice for calibration of the flow rate output of meter 61.

FIG. 3 illustrates calibration curves for one embodiment of the diffuser of FIGS. 1 and 2. As will be seen from FIG. 3, a plot of the differential pressure or pressure drop between the neck and ambient room pressure in inches of water vs. flow rate is shown. Lower curve 71 is flow rate in cubic feet per minute, while upper curve 81 is the square of flow rate in cubic feet per minute per 1000. As will be seen the square of the flow rate, divided by 1000, tends to be very linear.

The diffuser for which curves 71 and 81 were generated is for a THERMAFUSER 12-inch VAV diffuser manufactured by Acutherm LP of Oakland, Calif. The THERMAFUSER diffuser has its dampers in the maximum open position and 40 inches of straight duct 22 running into the diffuser neck. Tube 42 has a diameter of ¼ inch with holes 43 every inch along neck section 47 with holes 43 having a diameter of about 0.045 inches. The holes are at about 90 degrees to the direction of air flow in the neck. In the test diffuser for which the data of FIG. 3 were generated, tube 42 simply went across the tube at a slight angle to the control assembly 23, rather than being bent at bends 58 and 59. This alternative is shown in FIG. 2 in broken lines at 47a.

In a most preferred form, tube 42 is one-piece or monolithic tube that extends from openings 43 to distal end 46. As will be understood, however, that pressure tube 42 also can be formed of sections which are coupled together by a coupling sleeves or the like.

A differential air pressure measurement device suitable for use in the present invention will have a conventional pressure transducer assembly capable of sensing relative low pressure differentials (below an inch of water) and can take the form of virtually any of those devices currently being employed in conventional flow hood assemblies. In a most preferred form, detachable portion 40 of the present pressure drop sensing assembly is provided by a pressure differential sensing measurement device 61 that is hand-held and includes a wand 62 having an end 63 that is formed and dimensioned to be releasably coupled to distal end 46 of tube 42. In the most preferred form, wand 62 has a length that would allow an average height technician to hold meter 61 in one hand and use the other hand to manipulate wand 62 to a position coupling of end 63 of the wand to distal end 46 of the pressure tube, for example, located in the ceiling of the room. Thus, a wand 62 which is 2 to 4 feet in length and has a flexible rubber sleeve 63 at its end that can be slipped over distal end 46 of tube 42 will be adequate for conventional office building ceiling heights.

The use of a wand greatly facilitates pressure measurement as compared to flow hoods. The technician, for example, can stand to one side of a partition or piece of furniture and reach up over the partition or furniture to couple wand end 63 to distal end 46, without having to be directly under the diffuser or move the furniture and/or partition. There is no bulky flow hood that must be manipulated. The technician can attach the wand to distal end 46, take a measurement of the pressure which is converted into flow rate, then adjust the maximum damper opening of the diffuser and/or of a balancing damper upstream of the diffuser (not shown), using a screw driver or the like, in a manner which is well known in the industry. This process usually takes place with the diffuser appearance panel, or a ceiling panel 24, removed or moved to a position which will allow access to the diffuser damper adjustment screw or duct-mounted balancing damper adjustment arm or lever.

The present invention has been described above in terms of its application to air diffusers. It will be understood, however, that the same approach of providing a permanently mounted pressure tube in an air volume control device, such as a VAV control box upstream of the diffuser, or a return air flow control damper assembly, also could be employed. Many HVAC systems include VAV boxes upstream of diffuser 21 in conduit 22 to assist in controlling air flow in the overall conduit network. In such an air flow control device, the pressure tube would extend from the VAV box through to a ceiling panel 24. The tube could then either extend through the ceiling panel 24, or between the panel and the T-bar, or simply to proximate the ceiling panel which is removed. In each case the distal end of the pressure tube would be accessible from a room side 51 to room side 51 of the flow control housing. This requires tube installation steps which can be employed in either retrofit or initial installation, but which also will required a passageway (which can include removal of a ceiling panel 24) to provide access to distal end 46 of the pressure tube from room side 51 of the housing.

It will also be understood that the pressure tube of the present invention could be mounted across conduit 22 above and approximate neck 31 of the diffuser. This is less desirable than mounting tube 42 to the diffuser housing since it must be done onsite during installation of the system, rather than as part of a manufacturing process for diffuser 21.

The method of measuring the air pressure in an air flow control device of the present invention, therefore, comprises the steps of: mounting an air pressure communicating tube having at least one opening therein to a housing of the air flow control device in a position to sense supply air pressure at a known area of the air flow control device. The tube is formed to communicate the sensed air pressure to an open distal end 46 of the tube, which end is positioned on a room side 51 of the air flow control device. The next step in the present method is to releasably couple a differential air pressure measurement device 61 to distal end 46 of the tube from the room side of the air flow control device. Once coupling has been achieved, the method includes a step of measuring the air pressure drop between the air flow control device and the ambient room air pressure using the measurement device. After the measuring step, the differential air pressure measurement device is removed from the distal end, leaving the pressure tube mounted in the air flow control device for subsequent measurements, as required.

In the present method these steps can be repeated for a plurality of air flow control devices in an HVAC system and the measured air pressure drops used to balance the flow of air from the devices and through the system fan by adjusting a damper or other movable element in the air flow control device or upstream thereof. Most preferably the method is accomplished by mounting the pressure tube upstream of a damper assembly of a fixed or variable air volume diffuser. Most preferably the releasable coupling step of the present invention is accomplished by coupling a hand held wand 62 of pressure measurement device 61 to distal end 46 of the pressure tube.

The foregoing description of a specific embodiment of the present invention has been presented for purposes of illustration and description. It is not intended to be exhaustive or to limit the invention to the precise forms disclosed and many modifications and variations are possible in light of the above teaching. The embodiment was chosen and described in order to best explain the principals of the invention and its practical application so as to enable others skilled in the art to best utilize the invention and the embodiment with various modifications, as are suited to the particular use contemplated. It is intended that the scope of the invention be defined by the claims appended hereto and their equivalents.

What is claimed is:

1. An air flow control device with a pressure sensing assembly comprising:
    a housing formed for mounting to an air conduit and formed for the passage of air through the housing for one of discharge into and exhaust from a room; and
    at least one pressure tube having at least one opening therein, the tube being mounted to the housing with the opening positioned proximate a known cross sectional area of the housing to communicate pressure at the opening into the tube, and the tube extending from the opening to an open distal end with the distal end being secured in a position accessible from a room side of the housing, and the distal end being formed for releasable coupling of a pressure measurement device to the distal end for measurement from a room side of the housing of an air pressure differential in the housing proximate the area to enable a determination of the air flow rate in the housing at the known cross sectional area.

2. The assembly as defined in claim 1 wherein,
the flow control device is an air diffuser having a diffuser housing, and
a pressure tube is secured to the diffuser housing in a position to enable measurement of supply air pressure in the housing and the distal end is positioned on a room side of the diffuser housing.

3. The assembly as defined in claim 2 wherein,
the pressure tube is an elongated tube mounted to extend transversely substantially across a neck of the diffuser housing, and the elongated tube is formed with a plurality of openings spaced along the tube across the neck.

4. The assembly as defined in claim 3 wherein,
the elongated tube has a closed end opposite the distal end, the openings are oriented to be approximately perpendicular to the direction of flow of the incoming supply air in the neck to enable sensing of a static air pressure differential relative to ambient room air pressure, and the tube diameter is sufficiently small so as to not significantly impede the flow rate of supply air discharged through the neck and from the diffuser.

5. The assembly as defined in claim 2 wherein,
the tube is provided by a monolithically formed tube extending from a neck section of the tube to the distal end.

6. The assembly as defined in claim 2 wherein,
the air diffuser is a variable air volume diffuser having a movable damper assembly, and
the pressure tube is positioned to permit full opening and closing of the diffuser damper assembly.

7. The assembly as defined in claim 2 wherein,
the pressure tube has a neck section which extends across the diffuser housing proximate a neck portion of the diffuser, and the pressure tube has an extension section which extends from the neck section outwardly through an outside wall of the housing and along the outside wall of the housing to position the distal end proximate a discharge opening of the diffuser.

8. The assembly as defined in claim 7 wherein,
the extension section passes inwardly through the outside wall of the diffuser proximate the discharge opening to position the distal end inwardly of the periphery of the housing at the discharge opening.

9. The assembly as defined in claim 7 wherein,
the neck section is formed to bend around a damper control assembly provided in the neck portion of the housing.

10. The assembly as defined in claim 1, and
an air pressure measurement device including a transducer assembly formed to measure the differential pressure between the pressure communicated to the distal end of the pressure tube and an ambient room air pressure, and a wand coupled to the transducer at one end and formed at an opposite end for releasable coupling to the distal end of the pressure tube.

11. The assembly as defined in claim 10 wherein,
the wand has sufficient length to enable releasable coupling to the distal end of the pressure tube for a diffuser housing mounted in the ceiling of the room.

12. The assembly as defined in claim 11 wherein,
the pressure measurement device is a hand-held device, and
the opposite end of the wand includes a resiliently flexible end sleeve adapted to be slid over the distal end of the pressure tube.

13. The assembly as defined in claim 10 wherein,
the pressure measurement device is calibrated to provide an output measurement of the rate of flow of supply air discharged from the diffuser based upon the pressure difference sensed.

14. The assembly as defined in claim 13 wherein,
the pressure measurement device is adapted to provide a plurality of outputs each calibrated to provide a rate of flow for supply air discharged from a selected one of a plurality of diffusers of differing configurations.

15. A pressure sensing assembly for mounting to an air flow control system comprising:
a pressure tube having at least one opening therein adapted for communication of air pressure at the opening into the pressure tube, the pressure tube extending from the opening at a known cross section area of the housing to an open distal end of the tube remote of the opening for the communication of pressure at the opening to the distal end; and
a mounting structure formed for mounting the pressure tube to a housing of an air flow control device with the opening positioned and orientated to communicate air pressure at the opening into the pressure tube, and the mounting structure being further formed to mount the distal end of the pressure tube for access to the distal end from a room side of the air flow control device to enable releasable coupling of a pressure measurement device to the distal end from the room side of the air flow control device.

16. The assembly as defined in claim 15 wherein,
the air flow control device is a diffuser,
the mounting structure is formed to mount the tube to extend across a neck portion of the diffuser housing, and
the pressure tube has a plurality of openings therein.

17. The assembly as defined in claim 15 wherein,
the mounting structure is provided by forming the pressure tube with a plurality of bends configured to extend through side walls of a diffuser housing.

18. The assembly as defined in claim 16 wherein,
mounting structure is formed for orienting the openings at about 90° to the direction of air flow across the pressure tube.

19. The assembly as defined in claim 15, and
an air pressure measurement device including a transducer formed to measure the difference between the air pressure in the pressure tube and ambient room air pressure, and a wand adapted for releasable coupling of the distal end of the pressure tube to the transducer.

20. A method of measuring the air pressure difference at a known area of an air flow control device housing comprising the steps of:
mounting at least one air pressure communicating tube having at least one opening therein to a housing of the air flow control device in a position in the housing having a known cross sectional area to sense supply air pressure in the air diffuser at the opening, the tube being formed to communicate the sensed air pressure to an open distal end of the tube positioned on a room side of the air flow control device;
from the room side of the air flow control device, releasably coupling an air pressure measurement device to the distal end of the tube; and
measuring an air pressure communicated to the distal end of the tube.

21. The method as defined in claim 20, and
after the measuring step removing the air pressure measurement device from the distal end leaving the tube mounted in the air flow control device.

22. The method of claim 20, and the steps of:
repeating the steps of claim 20 for a plurality of air flow control devices in a HVAC system; and
using the measured air pressures to balance the flow rate of air discharged from the plurality of air flow control devices in the HVAC system.

23. The method as defined in claim 20 wherein,
said mounting step is accomplished by mounting the tube upstream of a damper assembly of a variable air volume diffuser; and the step of:
opening the damper assembly in the diffuser to a maximum opening before the measuring step.

24. The method as defined in claim 20, and the step of:
after the measuring step, adjusting one of a balancing damper in the HVAC system and a damper in the diffuser to balance discharge of supply air from the diffuser with the air discharged from other diffusers in a HVAC system in which the diffuser is mounted.

25. The method as defined in claim 24 wherein,
said mounting step is accomplished by mounting the tube to a fixed volume diffuser having an adjustable damper assembly, and the step of:
adjusting the damper assembly in the diffuser to produce a desired diffuser discharge rate.

26. The method as defined in claim 20 wherein,
said mounting step is accomplished by mounting the tube to a variable air volume box mounted in a supply air conduit.

27. The method as defined in claim 21 wherein,
the releasably coupling step is accomplished by coupling a hand-held wand of a differential pressure measurement device to the distal end of the tube.

28. The method as defined in claim 20 wherein,
the mounting step is accomplished by mounting a single tube to the housing, and
the measuring step is accomplished by measuring a differential pressure between the air pressure at the known cross sectional area and an ambient room air pressure.

* * * * *